United States Patent [19]

Murvall

[11] 3,968,943

[45] July 13, 1976

[54] SLIDING CLUTCH FISHING REEL

[75] Inventor: Åke Eugen Murvall, Svangsta, Sweden

[73] Assignee: ABU Aktiebolag, Svangsta, Sweden

[22] Filed: Dec. 4, 1974

[21] Appl. No.: 529,378

[30] Foreign Application Priority Data

Nov. 20, 1973 Sweden .............................. 7315660

[52] U.S. Cl. .............................................. 242/212
[51] Int. Cl.² ........................................ A01K 89/00
[58] Field of Search ........................... 242/212–216, 242/84.5 R, 84.53, 99, 129.8, 156

[56] References Cited
UNITED STATES PATENTS

| | | | |
|---|---|---|---|
| 2,893,656 | 7/1959 | Carlson | 242/84.8 |
| 3,226,052 | 12/1965 | King | 242/212 |

*Primary Examiner*—Leonard D. Christian

[57] ABSTRACT

This invention relates to spring means used in fishing reels for exerting resilient pressure on an element when a force is applied on the spring means, said spring means comprising a pair of first and second washers movably mounted in coaxial relationship in the fishing reel, said first washer being a domed spring washer having convex and concave sides with the concave side facing said element, said second washer having a substantially smaller diameter than said first washer and being mounted in a position between said element and the concave side of the first washer for dividing the total spring plane of the latter into two coaxial portions, whereby, when said washers are being pressed by a force against each other and against said element, said first washer is subjected to resilient deformation substantially in the portion thereof extending outwardly of the outer circumferential edge of said first washer, whereupon said first washer, when said force exceeds a predetermined value, is subjected to resilient deformation substantially in the portion thereof extending inwardly of the outer circumferential edge of said second washer.

5 Claims, 2 Drawing Figures

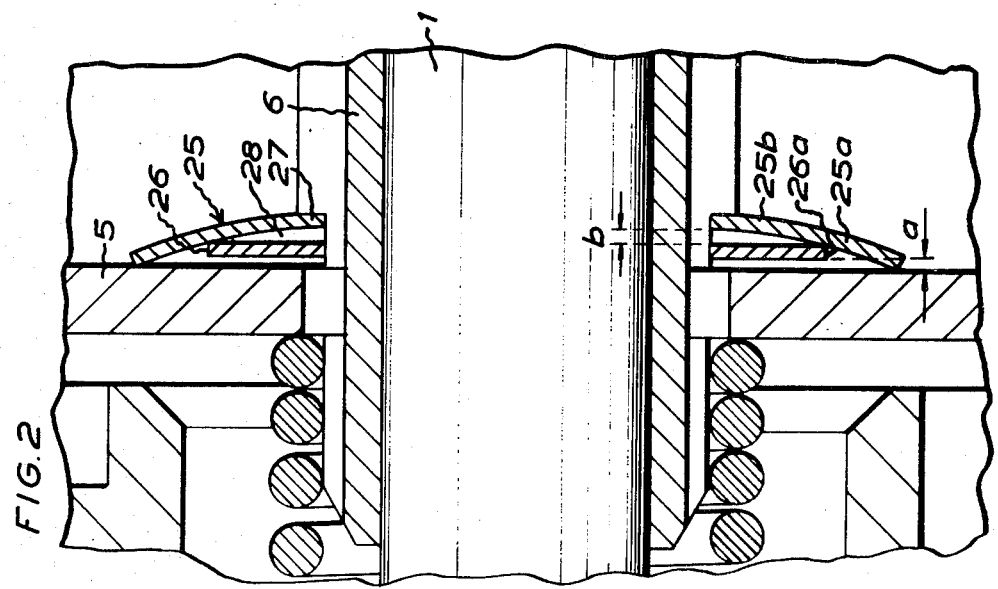
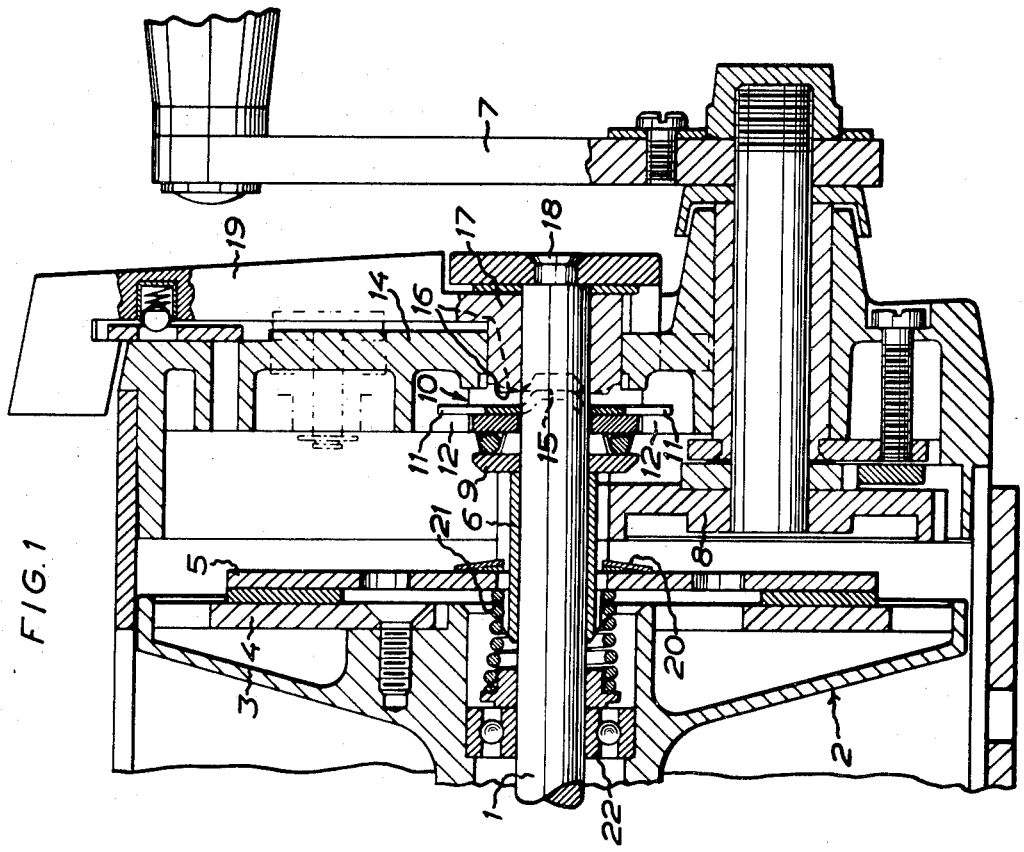

SLIDING CLUTCH FISHING REEL

The present invention relates to a fishing reel of the type having an adjustable sliding clutch arranged in the transmission between the crank and the spool, and spring means for obtaining resilient interengagement of two sliding clutch means.

On advanced fishing reels there are two clearly marked braking positions, generally called "strike drag" and "full drag." "Strike drag" is the braking position generally used when playing a fish, and "full drag" is a position corresponding to the maximum braking force desired and normally used when gaffing the fish. Immediately prior to dispensing the bait adjustment of the desired braking effect is effected by means of specific adjusting means while the desired control of the brake is then effected by means of a braking lever. As a rule, a hard braking effect is chosen but not so hard as to risk breaking of the line when the fish rushes. Consideration should then be taken to the fact that the braking power will be higher the more line the fish pulls out because the line as it is fed out from the spool will successively approach the centre of the spool (the rotational speed of the spool increases and the torque axis of the line relative to the spool decreases with the radius). By moving the braking lever backwards it is possible to decrease the braking force successively with respect to the strike drag position but it will always be possible to return quickly to the strike drag position in which the braking force is of a pre-set value. It is important, however, that the spool is not entirely disconnected by mistake when the braking force is reduced, e.g. from the strike drag position, since this would entail a risk of backlash. The braking lever therefore has a number, e.g. four, clearly perceptible positions within which the spool must not be entirely disengaged.

After the strike drag adjustment has been effected, the full drag position is obtained by successively moving the brake lever forwards from the strike drag position until reaching the desired full drag. For the desired full drag position the reel usually is equipped with an adjustable abutment by means of which a predetermined stop position for the braking lever may be preset. Thus, it should always be possible quickly to reduce the braking force by means of the braking lever but it should likewise always be possible quickly to return to full drag position. The braking force for "full drag" may be chosen so as to be substantially higher than that for "strike drag" due to the fact that the fish during the gaffing phase has not the strength required for long rushes, and the line has to be fed out from the maximum periphery of the spool (the major part of the line being at this moment taken home again). Moreover, often a double or stronger line part is employed at the outermost part of the line to permit the fisherman to apply a higher braking force in the gaffing operation. Also in case of "full drag" it is of course important that the braking force should not be as great as to allow breaking of the line or allow the stress to become so high that the tools would be destroyed.

Smooth sliding in the sliding clutch is the main condition for a satisfactory sea fishing reel. To obtain such smooth sliding it is necessary to have a means producing resilient application of the braking means and, as has already been mentioned, the spool should not be entirely disengaged in any of said four positions between "strike drag" and the disengaging position. Within the braking area it should be possible to effect the change of braking gradually without any sudden steps. However, between the strike drag position and the maximum full drag position a substantial change of braking force is desired. It is always possible to obtain a reduction of the total change of braking between these positions by means of the movable abutment.

The object of the invention is to provide a fishing reel of the described type with a simple but efficiently acting spring means whereby the resilient application of the braking means will have the desired characteristics described above.

This object has been realized by the spring means of this invention, comprising two washers movably mounted in coaxial relationship on a central supporting means, one of said washers being an arched spring washer adapted to act, with the outer circumferential edge of its concave side, upon a surface directly or indirectly connected with the adjustable friction clutch means, said washer having a diameter substantially greater than that of the other washer which is placed between said surface and the concave side of the spring washer and is arranged so as to divide the total spring plane of the spring washer into two coaxial portions so that the spring washer, when pressed against said surface, is first subjected to resilient deformation substantially in the portion thereof situated outwardly of the outer circumferential edge of the other washer, and then substantially in the portion thereof situated inwardly of said other washer.

According to a preferred embodiment said other washer cooperating with the spring washer is so arranged that it has no resilience of its own in the spring means and said other washer is placed between the rear side of an axially movable friction clutch disk and the spring washer and is freely movable between these elements along substantially only a distance (a) corresponding to the spring action distance for the resilient deformation of the outer part of the spring washer.

Further characteristics and advantages of the invention will be described in more detail below with reference to the accompanying drawing in which:

FIG. 1 is a longitudinal sectional view of part of the fishing reel, showing the transmission between the crank and the spool of the reel, and a friction clutch included in this transmission and provided with spring means according to the invention; and FIG. 2 is a detailed view which shows part of FIG. 1 viewed on a larger scale in order to illustrate the spring means.

The fishing reel shown in FIG. 1 is a fishing reel of the main type shown in U.S. Pat. Specification No. 3,799,472. The reel has a fixed shaft 1 on which a line spool 2 is rotatably mounted. The spool flange 3 shown in the drawing has on its outside an annular disk 4 forming part of a sliding clutch and having a friction surface for cooperation with a brake disk 5 which at its central bore is carried on, and engaged with a part of a gear wheel 6 which is rotatably and movably mounted on the shaft 1 and engages a gear wheel 8 which is rotatable by means of the crank 7. The gear wheel 6 on the shaft 1 abuts, via a radial ball bearing 9 displaceably mounted on the shaft 1, a pressure-transmitting ring 10 which is likewise displaceably mounted on the shaft 1 and straddles the end wall 14 of the reel by means of two parallel forks 11 and is controlled by two diametrically positioned guiding fins 12 on said end wall 14.

The pressure-transmitting ring 10 has an outwardly bent intermediate portion 15 which bears against the adjacent end 16 of a hub 17 mounted on the shaft 1 and in a bore in the spool end wall, said hub being retained on the shaft 1 by means of a head 18 connected with the shaft end. The hub 17 forms the inner end portion of a brake lever 19 by means of which the pressure-transmitting ring 10, upon rotation of the lever in a direction away from a position where the sliding clutch 4, 5 is disconnected, can be displaced axially inwardly for moving the ball bearing 9 and the gear wheel 6 inwardly on the shaft 1. This movement is transmitted to the brake disk 5 via spring means 20 which is the object of the present invention and will be described in detail below, said movement taking place against the action of a spring 21 mounted on the shaft 1 between the brake disk 5 and a ball bearing 22 which is mounted on the shaft 1 and is displaceable together with the spool 2 on the shaft.

The spool 2 is displaceable on the shaft 1 by means of a brake presetting means (not shown) which is mounted on the left-hand end wall (not shown) of the spool and by means of which the spool 2 and, consequently, the spool end wall 3 and the disk 4 can be moved closer to the brake disk 5 against the action of the spring 21 for presetting the braking force within the positions (disconnection — "strike drag" — "full drag") stated in the introduction of the specification.

In the introductory part it has also been stated that a smooth sliding in the sliding clutch, i.e. the braking means 4, 5, is the main condition for a satisfactory sea fishing reel and a resilient application of the braking means is required for such smooth sliding. A resilient application of the braking means may be obtained by means of a spring washer acting between the disk 5 and the displaceable member 6 but it has been found that such a spring washer cannot produce a successive, not too great a braking variation when braking up to the described strike drag position and a hard spring action for a desired great change of braking between the strike drag and the full drag positions. Anyway, these characteristics cannot be obtained in a simple and efficient manner by means of a single spring or through a non-uniform pitch acting upon the spring means.

However, this problem has been solved by this invention according to which the spring means 20, which is best shown in FIG. 2, comprises two washers 25, 26 mounted on the means 6, one of which, i.e. the axially outer washer 25, is an arched spring washer having a substantially greater diameter than has the axially inner washer 26 which in the embodiment shown forms no spring and is planar. The arched, outer spring washer 25 bears with its outer circumferential edge against the brake disk 5 and with its inner circumferential edge against a shoulder 27 on the gear wheel 6 which is movably mounted on the shaft 1 and is rotatable by means of the crank 7 for driving the spool 2 via the sliding clutch 4, 5.

The planar washer 26 placed between the brake disk 5 and the arched spring washer 25 rests in the position shown in FIG. 2 with its outer circumferential edge against the inwardly facing concave side of the spring washer 25 and is freely displaceable a certain distance $a$ between the brake disk 5 and the spring washer 25. The washer 26 will define an interspace 28 relative to the concave side of the spring washer 25 when the spring washer first comes in contact with the washer 26.

When the brake is applied by means of the brake lever 19, there is obtained a smooth spring action along a spring distance $a$ corresponding to the distance between the spring washers 25, 26 at their inner circumferential edges, which results in a desired, not too great brake variation in braking up to the "strike drag" position. As counted from the position in which the washer 26 is pressed by the washer 25 against the brake disk 5, the washer 26 will divide the spring action plane of the spring washer 25 into two concentric halves 25a, 25b, one of which is positioned radially outwardly and the other radially inwardly of the outer circumferential edge 26a of the washer 26. If the spring washer 25 is continuously pressed against the brake disk 5, a hard spring action is produced along the spring distance $b$, which results in the desired great change of braking between the strike drag and full drag positions. It should be noted that measures $a + b$ according to FIG. 2 comprise together only tenths of millimeters. Thus, the invention achieves in a very simple and efficient manner the object of producing the desired spring characteristics which would be very difficult to obtain otherwise by using a single spring or by actuating the braking means in some way by a varying gear or pitch of some kind.

In the illustrated embodiment the washer 26 is of planar configuration and does not itself act as a spring. It is possible, however, to use an arched spring washer to obtain a still smoother transition between the spring positions $a$ and $b$ or to modify the progressivity of the spring action. Thus, the invention is not strictly restricted to the embodiment shown and not either exclusively to so-called sea fishing reels.

What I claim and desire to secure by Letters Patent is:

1. A fishing reel comprising a rotatable part, a hand crank, a transmission and an adjustable clutch in said transmission for connection of said crank with said rotatable part with an adjustable sliding force, said clutch comprising two clutch members, at least one of which is movable in relation to the other to and from a fully inter-engaged position of said clutch members, adjustable spring means for exerting adjustable resilient inter-engagement force on said sliding clutch members, and adjusting means for adjusting said spring means and thereby adjusting said inter-engagement force of said sliding clutch, said spring means comprising two washers mounted coaxial and relatively movable, one of said washers being an arched spring washer mounted between and in contact with two surfaces, one of which is movable by said adjusting means to press said spring washer with adjustable force against the other surface for exerting said adjustable resilient inter-engagement force on said clutch members, wherein said arched spring washer has a diameter substantially greater than that of the other washer and said other washer is mounted between the concave side of said arched spring washer and adjacent one of said surfaces for dividing the total spring plane of the arched spring washer into two coaxial portions, whereby the arched spring washer, when pressed between said surfaces, is first subjected to resilient deformation over an area which comprises the portion thereof situated outwardly of the outer circumferential edge of said other washer and then, when in contact with said other washer and further pressed, is subjected to resilient deformation restricted substantially to the portion thereof situated inwardly of the outer circumferential edge of the said other washer.

2. A fishing reel as claimed in claim 1, wherein said other washer is a washer without any resilient function in the spring means.

3. A fishing reel as claimed in claim 2, wherein said other washer is placed between the rear side of an axially movable friction clutch disk and the spring washer and is freely movable between these elements along substantially only a distance corresponding to the spring action distance for the resilient deformation of the outer part of the arched spring washer.

4. A fishing reel having a spring means for exerting resilient pressure on an element in the fishing reel when a force is applied on said spring means, said spring means comprising a pair of first and second washers movably mounted in coaxial relationship in the fishing reel, said first washer being a domed spring washer having convex and concave sides with the concave side facing said element, wherein said second washer has a substantially smaller diameter than said first washer and is mounted in a position between said element and the concave side of said domed first washer for dividing the total spring plane of the latter into two coaxial portions, said first washer contacting said second washer and said element when said washers are being pressed toward said element, said domed first washer is first subjected to resilient deformation in an area comprising the portion thereof extending outwardly of the outer circumferential edge of said first washer, whereupon said first washer, when said force exceeds a predetermined value, is subjected to resilient deformation which is restricted by said second washer substantially to the portion of said first washer which is situated inwardly of the outer circumferential edge of said second washer.

5. A fishing reel comprising a rotatable part, a hand crank, a transmission and an adjustable clutch in said transmission for connection of said crank with said rotatable part with an adjustable sliding force, adjustable spring means for exerting adjustable resilient inter-engagement force on said sliding clutch, and adjusting means for adjusting said spring means and thereby for adjusting said inter-engagement force of said sliding clutch, said spring means comprising an arched spring plate member having a concave side and a convex side, said spring plate member being mounted between and in contact with two surfaces, one of which is movable in relation to the other by said adjusting means to press said spring plate member with adjustable force against the other surface for exerting said adjustable resilient inter-engagement force on said sliding clutch, wherein said spring means further comprise means between said concave side of said spring plate member and the adjacent one of said surfaces for dividing the total spring plane of said spring plate member into inner and outer portions so that the arched spring plate member when pressed between said surfaces is first subjected to resilient deformation over an area which comprises the portions thereof situated outwardly of said spring plane dividing means and then, when in contact with said dividing means and further pressed, is subjected to resilient deformation which is restricted substantially to the portion thereof situated inwardly of said spring plane dividing means.

* * * * *

UNITED STATES PATENT OFFICE
CERTIFICATE OF CORRECTION

PATENT NO. : 3,968,943
DATED : July 13, 1976
INVENTOR(S) : Ake Eugen Murvall

It is certified that error appears in the above-identified patent and that said Letters Patent are hereby corrected as shown below:

On the title page of the patent preceding the Abstract, cancel the following:

-- [30] Foreign Application Priority Data
    Nov. 20, 1973    Sweden ...........7315660    --

Signed and Sealed this

Twenty-sixth Day of October 1976

[SEAL]

Attest:

RUTH C. MASON
Attesting Officer

C. MARSHALL DANN
Commissioner of Patents and Trademarks